United States Patent [19]

Kaetzel

[11] 4,218,867

[45] Aug. 26, 1980

[54] HAYMAKING MACHINE

[75] Inventor: Pierre Kaetzel, Saverne, France

[73] Assignee: Samibem, S.A., Marmoutier, France

[21] Appl. No.: 950,260

[22] Filed: Oct. 10, 1978

[30] Foreign Application Priority Data

Oct. 7, 1977 [FR] France .............................. 77 30788

[51] Int. Cl.² ...................... A01D 77/00; A01D 79/00
[52] U.S. Cl. .................................................... 56/370
[58] Field of Search ................................. 56/365–377, 56/28

[56] References Cited

U.S. PATENT DOCUMENTS 2,872,773   2/1959   Van der Lely et al. ............... 56/377
3,218,788  11/1965   Hubbard ................................. 56/28
3,611,690  10/1971   Zvweegers ............................ 56/366

FOREIGN PATENT DOCUMENTS 1054264   1/1955  Fed. Rep. of Germany ............ 56/370
1582334   9/1970  Fed. Rep. of Germany ............ 56/370
   5693   of 1908  United Kingdom ..................... 56/367

Primary Examiner—Russell R. Kinsey
Attorney, Agent, or Firm—Young & Thompson

[57] ABSTRACT

A haymaking machine with at least one drum rotating about a substantially vertical axis and carrying flexible resilient elements of rubber or plastic in plate-like or bifurcated or various other forms and adapted to lift and impel cut fodder without the use of metal tines.

2 Claims, 7 Drawing Figures

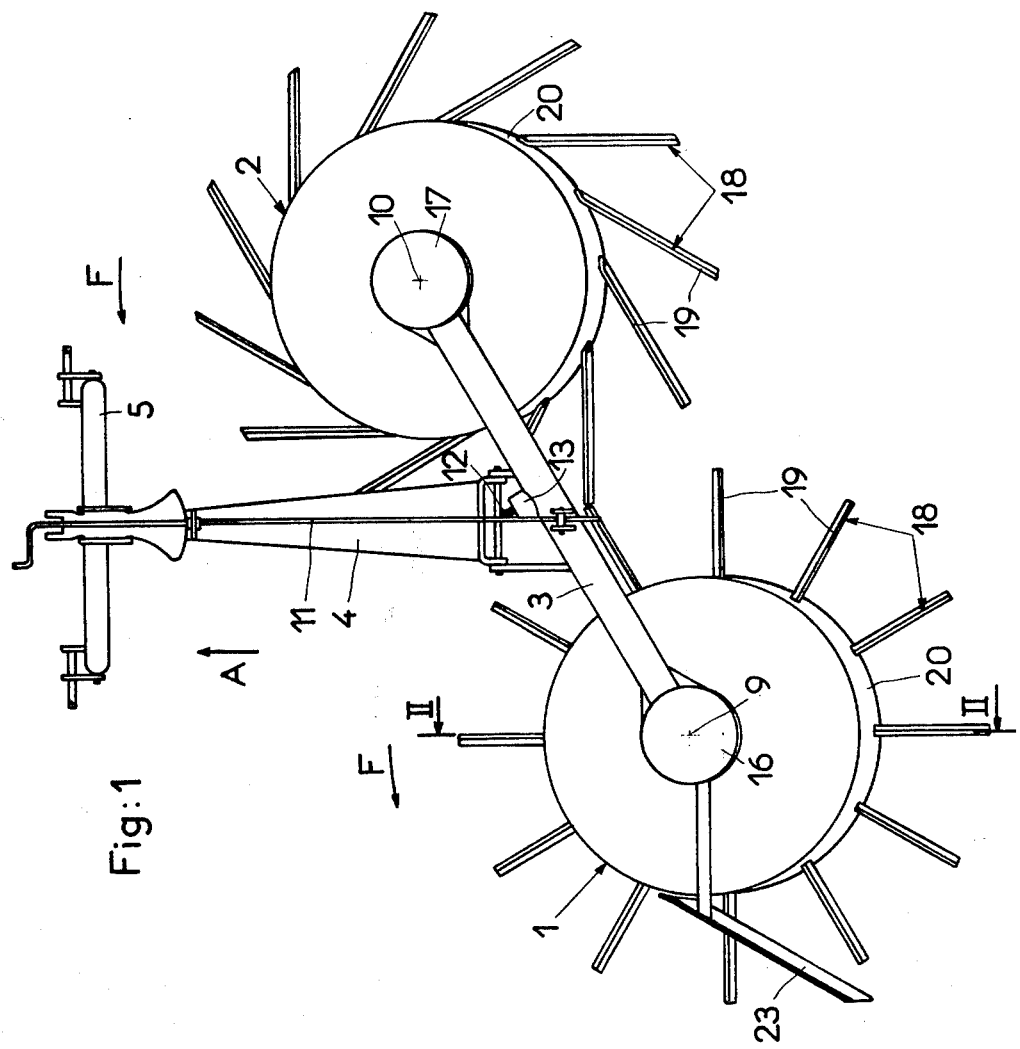

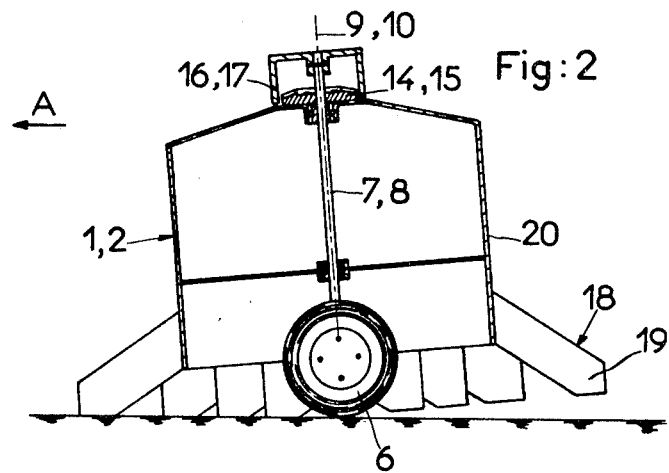
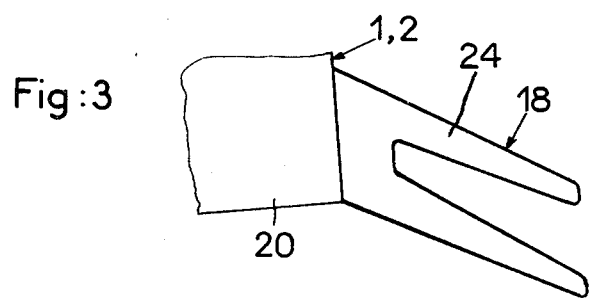
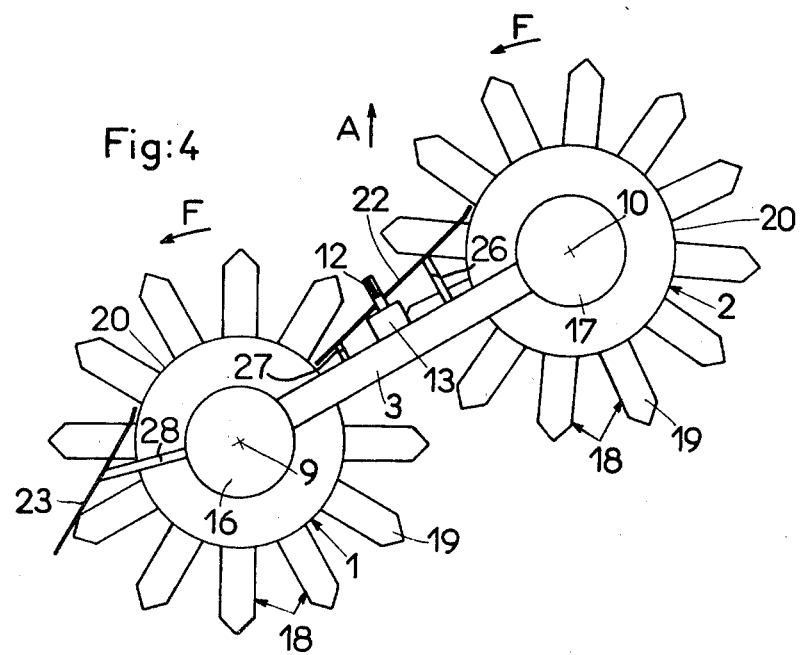

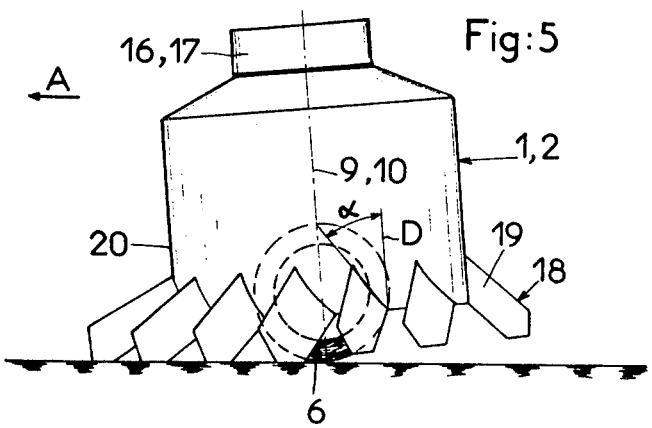
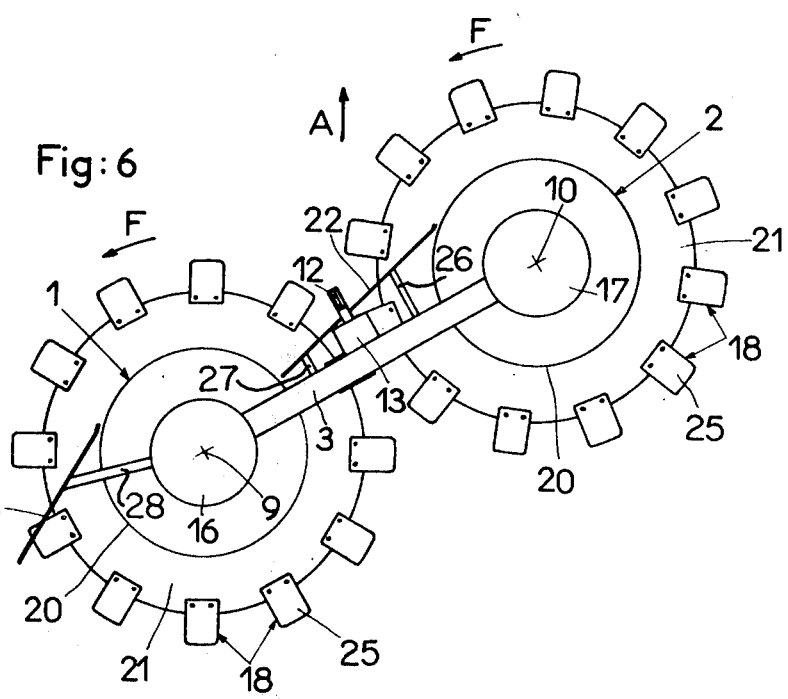
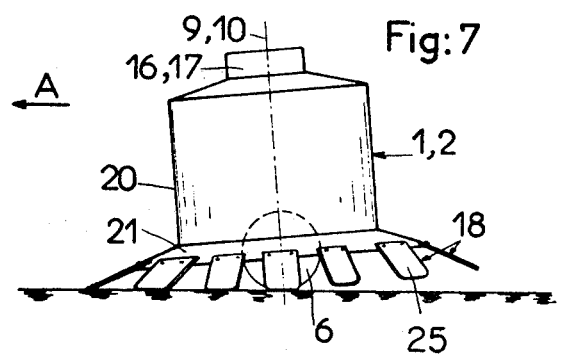

HAYMAKING MACHINE

The present invention relates to a novel type of haymaking machine for the windrowing of fodder, the turning of windrows or for tedding, comprising at least one drum rotating about a substantially vertical or inclined axis.

Up to the present a very large number of types of haymaking machines for the above-mentioned tasks exists. These machines however possess one common characteristic: they possess metallic tines or the like elements of variable lengths. These tines, intended to displace the fodder, possess grave drawbacks.

The said tines can in fact be broken without the user being aware of this. In particular on machines having tines which extend radially and substantially parallel with the ground, it frequency occurs that the said tines dig themselves into the ground and break, if the user of the machine omits to cause the rotary rake heads to rotate, before progressing with the tractor. The broken tine is then lost in the fodder which is intended to be collected for example with the aid of a baler or a pick-up chopper. Now the passage of a broken tine into such a machine generally causes very significant damage, the repair of which is extremely lengthy and burdensome, and of course this happens at the precise moment when the user has an urgent need to bring his fodder in on time, while the meteorological conditions are favorable. Thus the tines of haymaking machines constitute a permanent danger for balers and pick-up choppers. Furthermore, these lost tines or pieces of tines are in danger of injuring the animals.

Despite all the precautions which may be taken, the said metallic tines of haymaking machines are still quite rough on the one hand towards the cut fodder and on the other towards young growth of vegetation. Now it is known that the more gently the fodder is treated, especially in windrowing, the more it retains its nutrient qualities and the better is the yield.

Furthermore, these tines generally drag the fodder over the ground during normal operation. For this reason the said fodder is often soiled by the earth, which can cause its rejection by the animals.

Another known machine is provided with flexible plates situated entirely in vertical planes to displace the fodder. However, these plates displace the fodder squarely on the ground. This causes significant soiling which reduces the quality of the fodder and can further occasion losses of fodder as a result of its friction on the ground.

The present invention aims at remedying the above-stated drawbacks by proposing a machine as described in the introduction which presents no risk either for the machines or for the stock and furthermore treats the cut fodder and also young vegetation growth with extreme gentleness and causing no soiling of the fodder. To this end one important characteristic of the invention consists in that each drum of the machine carries at its base flexible and deformable plates of rubber or an analogous material which displace the fodder during normal operation, the said plates being at least partially inclined so that they form a certain angle with a straight line parallel to the rotation axis of the corresponding drum. By virtue of their flexibility the said plates are not harmful either to the cut fodder or to the young vegetation growth. Moreover, by means of the fact that these plates are deformable, there is practically no danger of breakage when they encounter an obstacle, and thus no risk of damage to machines such as balers or pick-up choppers. In the case where one of these plates or a part of one of these plates should nevertheless be lost in the fodder, their constitution would permit them to pass through a baler or a pick-up chopper without damaging these machines. Furthermore, by virtue of the inclination of the said plates, the fodder slides over them and they keep it out of contact with the ground during working. Thus, this fodder does not rub on the ground and remains free from soiling.

According to a further characteristic of the invention, the flexible and deformable plates extend in planes substantially perpendicular to the rotation axis of the corresponding drum. In this form the said plates are advantageously attached to a flange constituting the base of the drum. Thus the said plates lift the fodder laid on the ground and this fodder can then pass over the flange of the corresponding drum so that it remains removed from the ground during operation.

The machine according to the invention can advantageously comprise several drums carrying flexible and deformable plates, which drums can be placed side by side and slightly staggered towards the rear in relation to one another, especially for lateral windrowing. Moreover, between two adjacent drums there may be provided a deflector favoring the passage of the fodder from one drum to the other, and laterally of the drum placed rearmost there can be provided a deflector favoring the formation of a lateral windrow.

The invention will be explained in greater detail hereinafter with reference to several forms of embodiment which are illustrated by way of non-limitative example in the accompanying drawings, wherein:

FIG. 1 represents a plan view of a machine according to the invention;

FIG. 2 represents a section of a drum of the machine as illustrated in FIG. 1, along the section line II—II;

FIG. 3 represents, on a larger scale, a variant of the flexible and deformable plates;

FIG. 4 represents a reduced plan view of a variant of a machine according to the invention;

FIG. 5 represents, on a larger scale, a side view of a drum of the machine as illustrated in FIG. 4;

FIG. 6 represents a plan view of another variant of a machine according to the invention; and FIG. 7 represents a side view of a drum of the machine as illustrated in FIG. 6.

As represented in the accompanying drawings, the haymaking machine according to the invention comprises for example two substantially identical drums 1 and 2. These drums 1 and 2 are interconnected by a transverse support chassis 3. The latter is connected by means of a connection beam 4 extending forward to a three-point mounting device 5 permitting coupling of the machine to a propelling tractor (not shown). During normal operation, the machine can move over the ground by means of small wheels 6 or skids, preferably placed beneath the drums 1 and 2.

The said drums 1 and 2 are preferably rigid and can be made of sheet metal or plastic material. Each drum 1, 2 is freely rotatably mounted on a central support spindle 7, 8, the lower extremity of which is connected to the axle of the aforementioned wheel 6. During normal operation each drum 1, 2 is driven in rotation about a geometric axis 9, 10 which is substantially vertical or inclined forward, according to the nature of the work to be carried out. The said forward inclination of the drums 1, 2 can be adjusted by means of a threaded crank handle 11 which causes the transverse support chassis 3 to pivot in relation to the connection beam 4, when the handle is operated. The said rotating drive of the drums 1, 2 can be effected mechanically from the power take-off shaft of the tractor. For this purpose, the said shaft is connected by means of a Cardan shaft (not shown) to an intermediate shaft 12 extending into a gear box 13 on the transverse support chassis 3. The said intermediate shaft includes on its end situated in the box 13 a bevel pinion which meshes with a second bevel pinion fitted on a longitudinal shaft, which is disposed in the transverse support chassis 3 and extends from one drum to the other. This shaft comprises at each of its extremities of a bevel pinion which meshes with toothed gears 14, 15 fixed to the corresponding drums 1, 2 (FIG. 2). These bevel pinions and toothed gears are lodged in boxes 16 and 17 of the transverse support chassis 3. Thus, during normal operation, the intermediate shaft 12 connected to the power take-off shaft drives the longitudinal shaft, which drives the drums 1 and 2 in rotation.

It is apparent that other means can be utilized to effect the rotating drive of the drums 1 and 2 without thereby departing from the scope of the invention. For example, the said drums can equally be driven in rotation by the ground. In this case each drum 1, 2 would possess a zone of contact with the said ground, by virtue of which the displacement of the machine in its direction A of travel would cause the rotation of the said drums.

Each drum 1, 2 carries at its base flexible and deformable elements 18 of rubber, or an analogous material such as plastic material, which displace the fodder during normal operation. These elements 18 are constituted by plates 19, 24, 25 of elongated form which are independent of one another. They extend outwards and substantially downwards from the wall 20 of the corresponding drum 1, 2. The said plates can be attached to the walls 20 of the drums 1 and 2 for example by gluing, riveting, screwing or even in an easily removable manner by the use of a kind of press stud or the like.

The machine according to the invention thus does not possess the drawbacks cited in the introduction, of the haymaking machines equipped with metallic tines for working the fodder.

In order that the flexible and deformable plates 19 may suitably rake the fodder laid on the ground, their outer end can be cut in a pointed form with one of the edge portions being disposed parallel to the ground (FIG. 2). With this same purpose, the plates 24 can likewise be cut in the form of forks in accordance with the example of embodiment as illustrated in FIG. 3. Moreover, these flexible and deformable plates 19, 24, 25 may comprise reinforcements in order to increase their wear resistance. These reinforcements may be constituted in a manner known per se by braided wires which are embedded in the said plates.

In the embodiment represented on the drum 1 of the machine as illustrated in FIG. 1, the flexible and deformable plates 19 extend radially. In this position the said plates have a good rake over the fodder. They thus displace the said fodder over a large sector of their trajectory and can even cause turning of the fodder.

In the example of embodiment as represented on the drum 2 in the machine as illustrated in FIG. 1, the flexible and deformable plates 19 are oriented in the direction opposite to the rotation direction of the said drum 2 as indicated by the arrow F. In this case the said plates have a gentle incidence upon the fodder and the latter can easily disengage itself from the said plates on the lateral part of the drum 2.

From these two examples of embodiment it appears that the position of the flexible and deformable plates 19 has a great influence upon their manner of raking. Thus, the position as represented on the drum 1 can be preferred for tedding or for the turning of windrows while the position as represented on the drum 2, where the plates 19 displace the fodder more gently, can advantageously be selected for the formation of a windrow. Moreover, in order that the flexible and deformable plates 19 of one and the same machine can be perfectly well adapted to different tasks such as windrowing, windrow turning or tedding, means can be provided which permit of adjusting the positions of the said plates.

In accordance with an important characteristic of the invention, the flexible and deformable plates 19 are at least partially inclined so that they form an angle $\alpha$ with a straight line D parallel to the rotation axis 9, 10 of the corresponding drum 1, 2 (FIG. 5). These plates 19 can form substantially the same angle $\alpha$ over their entire length or can be twisted so as to form a greater angle $\alpha$ at one of their extremities than at the other. This inclination permits the fodder to slide over the flexible and deformable plates 19 which keep it remote from the ground during its displacement. The fodder thus displaced is not soiled by the earth, which is a factor of good quality. Moreover, this avoids losses of fodder which could be caused by friction on the ground.

In the example of embodiment as represented in FIGS. 6 and 7, the flexible and deformable plates 25 extend in planes substantially perpendicular to the rotation axis 9, 10 of the corresponding drum 1, 2. In this case the said plates 25 are attached to a flange 21 of substantially frusto-conical form which constitutes the base of the drums 1, 2. Thus the said flexible and deformable plates 25 lift the fodder laid on the ground. Then this fodder passes over the flange 21 and is transported by the latter so that it remains remote from the ground during raking.

For lateral windrowing the drums 1, 2 according to the invention are placed side by side and preferably staggered in relation to one another towards the rear (FIGS. 1, 4 and 6). In this position the said drums 1, 2 are driven in the same rotation direction F. Thus the fodder is transferred from one drum to the other and deposited in the form of a windrow laterally of the machine. By virtue of the above-mentioned staggering of the drums 1, 2 the paths described by their flexible and deformable plates 19, 24, 25 partially overlap, in order to avoid losses of fodder between the said drums. With this same purpose a deflector 22 made of sheet-steel is disposed between the two adjacent drums 1, 2. This deflector closes the space existing between the two adjacent drums 1, 2 and aids the passage of the fodder from one drum to the other.

The said deflector 22 is connected to the transverse support chassis 3 by means of supports 26, 27. To the side of the rearmost drum 1 is disposed a deflector 23 which aids the formation of a windrow. This lateral deflector 23 intercepts the fodder displaced by the drum 1 so that this fodder is deposited in the form of a regular windrow. The said deflector 23 is made of sheet-steel and is connected to the gear box 16 by means of a support 28. For tedding the drums 1, 2 can be driven so that they rotate to converge at the front, so that they spread the fodder in the zone situated behind the machine.

Without departing from the scope of the invention it is possible to place the above-described windrowing drums at the front or rear of a machine intended to harvest fodder such for example as a self-loader, a pick-up chopper, a baler, a mower or a mower-conditioner, especially with the purpose of reducing the width of a windrow of mown fodder.

Although the accompanying drawings represent machines comprising two drums it is apparent that the number of drums can be modified and their form can be varied, as also can the relative position, without departing from the scope of the invention. Likewise it will of course also be possible to effect various modifications, improvements or additions to the different variants of embodiment as described, without thereby departing from the scope of the invention.

What is claimed is:

1. A haymaking machine for the windrowing of fodder, the turning of windrows or for tedding, comprising at least one drum rotating about a substantially vertical or inclined axis and carrying flexible and deformable plates of rubber or the like which displace the fodder during normal operation, said plates (19) extending in planes substantially perpendicular to the rotation axis (9, 10) of the corresponding drum (1, 2).

2. A haymaking machine according to claim 1, in which the flexible and deformable plates (19) are attached to a flange (21) of substantially frusto-conical form constituting the base of the corresponding drum (1, 2).

* * * * *